United States Patent [19]
Harden et al.

[11] 3,732,560
[45] May 8, 1973

[54] ROTATABLE INDICATOR HAVING LIGHT-EMITTING DIODE BACK-LIGHTING

[75] Inventors: Phillip L. Harden; Samuel M. Thomas, Jr., both of Fort Wayne, Ind.

[73] Assignee: Bowmar Instrument Corporation, Fort Wayne, Ind.

[22] Filed: Dec. 11, 1970

[21] Appl. No.: 97,168

[52] U.S. Cl. ............340/373, 240/2.1, 250/217 SS, 340/378 R
[51] Int. Cl. ..................G01d 11/28, H05b 33/00
[58] Field of Search ..................240/2.1; 250/217 SS; 340/378 A, 378 R; 313/108 D, 109.5; 116/DIG. 35, 124.4

[56] References Cited

UNITED STATES PATENTS

| | | | |
|---|---|---|---|
| 3,372,260 | 3/1968 | Bell | 116/124.4 X |
| 2,907,298 | 10/1959 | Steinke | 240/2.1 X |
| 3,500,391 | 3/1970 | Heske | 340/378 A |
| 3,581,162 | 5/1971 | Wheatley | 250/217 SS X |
| 3,264,640 | 8/1966 | Ducharme et al. | 340/378 A |
| 3,278,740 | 10/1966 | Madansky | 240/2.1 |
| 3,596,136 | 7/1971 | Fischer | 313/108 D |
| 3,480,950 | 11/1969 | Rachman | 340/378 R |

*Primary Examiner*—Donald O. Woodiel
*Assistant Examiner*—Daniel M. Yasich
*Attorney*—Hood, Gust, Irish, Lundy & Coffey

[57] ABSTRACT

A rotatable indicator, such as a rotatable magnetic position indicating wheel, including a cylindrical drum having opaque and translucent areas defining indicia on the outer drum surface, the drum being rotatably mounted on a supporting member. At least one solid state light-emitting device is provided, such as a light-emitting diode. The light-emitting device is supported on the supporting member within the drum and exposed to the inner surface thereof so that light emitted by the device back-illuminates the indicia on the drum.

7 Claims, 10 Drawing Figures

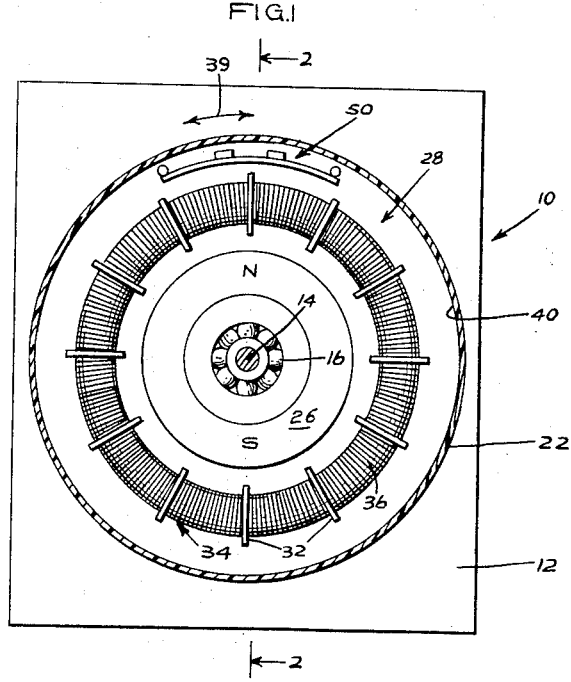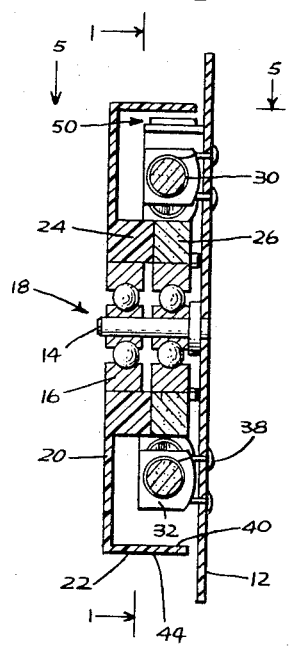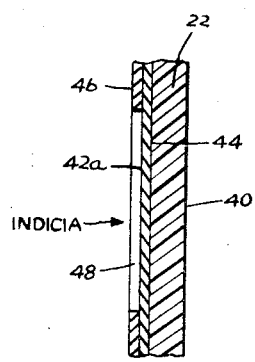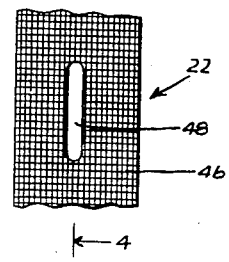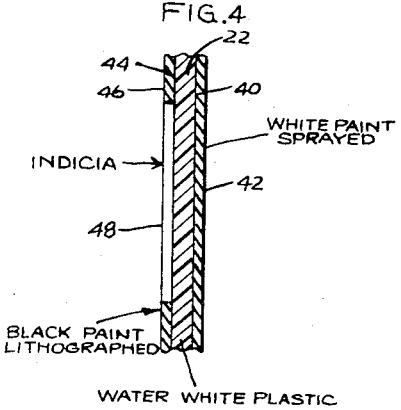

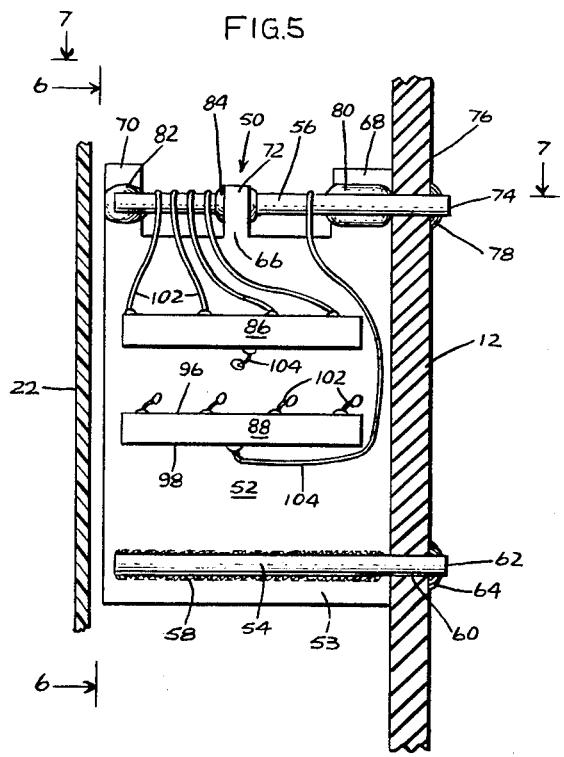
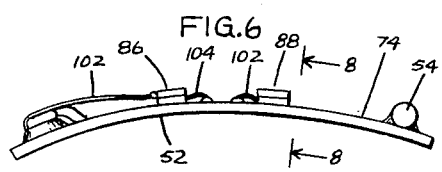
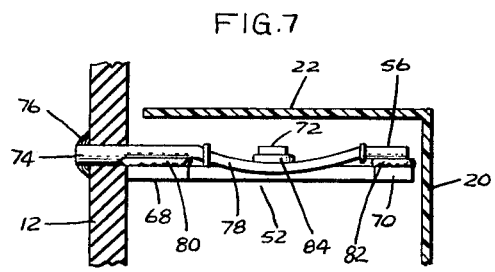
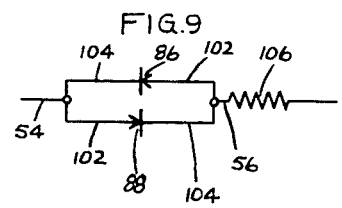
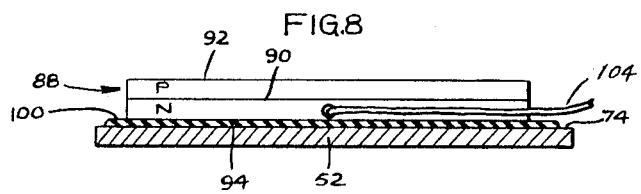

ROTATABLE INDICATOR HAVING LIGHT-EMITTING DIODE BACK-LIGHTING

BACKGROUND OF THE INVENTION

1. Field of the Invention

This invention relates generally to rotatable indicators, and more particularly to a rotatable indicator which is back-lighted by a solid state light-emitting device.

2. Description of the Prior Art

Rotary magnetic position indicators are commonly employed for displaying discreet indicia in response to the characters of a prearranged code. A common type of such indicator comprises a diametrically polarized permanent magnet rotor and a stator structure having selectively energizable field windings thereon, the rotor carrying a drum having the indicia displayed on it surface. Selective energization of the field windings causes the magnetic axis of the rotor to align itself with the respective poles of the field structure which are energized, thereby to provide the desired rotational indication.

It is frequently required that the indicator be lighted. Various types of front-lighting have been provided with the light illuminating the front surface of the drum and the indicia thereon, however, shadows, stray light and glare have been objectionable features of such front-lighting. It has therefore been considered desirable to provide back-lighting of the drum and indicia, light from a source disposed within the drum illuminating translucent areas on the drum which define the indicia. Such back-lighting has heretofore been provided by a conventional incandescent lamp. In certain applications, particularly in airborne installations, such rotary magnetic position indicators are highly miniaturized, the drum typically having a diameter less than one inch. Back-lighting of such miniature indicators with incandescent lamps has been difficult, it being necessary to accommodate an extremely tiny bulb within an extremely confined space. Such tiny bulbs are fragile, requiring frequent replacement, which, in turn, necessitates removal of the indicator from the panel and partial disassembly thereof. Further, the glowing filament of an incandescent lamp has necessitated provision for diffusion of the light, and appreciable heat is generated by the lamp which requires provision for dissipation.

It is therefore desirable to provide a back-lighted rotary indicator which does not employ an incandescent lamp.

It is well known that certain semiconductors having a p-n junction formed therein will emit light when an appropriate potential is applied across the junction. Further discussion of this phenonenon is contained in an article entitled "Light-emitting Semiconductors" by Fredrick F. Morehead, Jr., appearing in the *Scientific American* for May, 1967, pages 109–121. Such light-emitting diodes may be energized from a low voltage, direct or alternating current source, are highly reliable, rugged, and may be extremely small in size. Of the many semiconductor compounds which possess electroluminescent properties, in varying degrees, only a limited number, including gallium phosphide and gallium arsenide phosphide, have been found to have the desired efficiency, brightness, reliability and reproducability. Such light-emitting diodes thus lend themselves to use in back-lighting rotatable indicators, particularly those which are highly miniaturized.

SUMMARY OF THE INVENTION

The invention, in its broader aspects, provides a rotatable indicator comprising a cylindrical drum having inner and outer surfaces, the drum having opaque and translucent areas defining indicia on the outer surface. A supporting member is provided with means for rotatably mounting the drum thereon. At least one solid state light-emitting device is provided with means for supporting the device on the supporting member within the drum and exposed to the inner surface thereof. Means are provided for electrically connecting the device to a source of energizing potential, the light emitted by the device thus back-illuminating the indicia on the drum. In the preferred embodiment, the solid state light-emitting device comprises a light-emitting diode.

It is accordingly an object of the invention to provide an improved back-lighted rotatable indicator.

Another object of the invention is to provide an improved back-lighted rotatable indicator utilizing a light emitting diode as the light source.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a front cross-sectional view showing a rotary magnetic position indicator back-lighted in accordance with the invention;

FIG. 2 is a side cross-sectional view taken generally along the line 2—2 of FIG. 1;

FIG. 3 is a fragmentary view showing the outer surface of the drum of the indicator of FIGS. 1 and 2;

FIG. 4 is an enlarged cross-sectional view taken along the line 4—4 of FIG. 3 and showing one embodiment of the drum;

FIG. 4A is a view similar to FIG. 4 and showing another embodiment of the drum;

FIG. 5 is a fragmentary, top cross-sectional view taken generally along the line 5—5 of FIG. 2 and showing the light-emitting diode assembly in greater detail;

FIG. 6 is a front view of the light-emitting diode assembly taken along the line 6—6 of FIG. 5;

FIG. 7 is a fragmentary, side cross-sectional view taken generally along the line 7—7 of FIG. 5;

FIG. 8 is an enlarged cross-sectional view taken along the line 8—8 of FIG. 6; and FIG. 9 is a schematic diagram showing the electrical connection of the light-emitting diodes employed in the embodiment of the previous figures.

DESCRIPTION OF THE PREFERRED EMBODIMENT

Referring now to the figures of the drawing, there is shown a rotary magnetic position indicator, generally indicated at 10. Indicator 10 comprises a supporting board 12 formed of suitable, rigid insulating material. Shaft 14 is secured to board 12 and extends forwardly therefrom, as shown. Suitable anti-friction bearings 16 are positioned on shaft 14 and rotatably support rotor assembly 18.

Rotor assembly 18 comprises indicator drum 20 having an outer cylindrical drum portion 22 and an inner annular flange portion 24. Annular permanent magnet 26 is adhered to flange portion 24, flange portion 24 and magnet 26 being mounted on bearings 16, drum 20 and permanent magnet 26 thus rotating as a unit on bearings 16. Permanent magnet 26 is conventionally diametrically oppositely polarized, as shown in FIG. 1.

Stator assembly 28 comprises an annular yoke portion 30 which may be formed of suitable sintered magnetic material. Spacers 32 are equally spaced around core 30 to define coil-receiving sections 34, twelve being shown in the illustrated embodiment. Field windings 36 are respectively wound on sections 34 of core 30 between insulators 32. Stator assembly 28 is supported on board 12 by means of metal pins 38 secured to insulators 32 and extending through suitable openings in board 12. The respective ends of field windings 36 may be connected to pins 38 and appropriate connections (not shown) to pins 38 may be printed on the rear surface of board 12. Field windings 36 may be connected in the manner disclosed in U.S. Pat. No. 3,478,349 to Buuck et al. and assigned to the assignee of the present invention. It will be readily understood that with permanent magnet 26 being diametrically polarized, as shown, energization of selective ones of field windings 36 will cause the magnet axis of magnet 26 to align itself with the resulting magnetic poles formed in stator yoke 30, thereby rotating drum 20, as shown by arrows 39, so that a corresponding discrete indicia appearing on the outer surface of flange 22 is displayed through a viewing window (not shown).

In the embodiment of FIG. 4, drum 20 may be molded from suitable near-transparent or highly translucent plastic material, a material having a water-white color being preferred. The inner surface 40 of flange 22 is preferably lightly sprayed with white paint, as at 42. Outer surface 44 of flange 22 is lithographed with black paint or ink, as at 46, to define the desired indicia 48, which may be conventional alpha-numeric characters. It will thus be seen that illumination of the inner surface 40 of flange 22 of drum 20 will result in back-lighting of indicia 48.

In the preferred embodiment of FIG. 4A, drum 20 may be molded from clear or natural color plastic material and outer surface 44 of flange 22 is lightly sprayed with white or some other color paint, as at 42a. Painted surface 42a is then lithographed with black paint or ink, as at 46, to define indicia 48. Thus, in this embodiment, the indicia may appear in colors other than white.

In order to back-light indicia 48 on flange 22 of drum 20, light-emitting diode assembly 50 is provided disposed between inner surface 40 of flange 22 of drum 20 and stator assembly 28. Referring now particularly to FIGS. 5 through 9, light-emitting diode assembly 50 comprises a metal platform or support plate 52 which is arcuately curved to conform to the curvature of inner surface 40 of flange 22 of drum 20. Support plate 52 is supported on mounting board 12 by a pair of metal posts 54, 56. Post 54 is directly, conductively secured to plate 52 adjacent its end 53, as by welding at 58. End 62 of support rod 54 extends through hole 60 in board 12 and is secured to the rear surface thereof, as by solder 64. The other end 66 of plate 52 has a pair of outer projections 68, 70, and an intermediate projection 72 which is formed upwardly away from upper surface 74 of plate 52. Rod 56 has its end 74 extending through hole 76 in board 12 and is secured to the rear surface thereof as by solder 78. The portion of rod 56 projecting forwardly of board 12 is somewhat flattened and has a downwardly curved portion 78. The forwardly extending portion of rod 56 adjacent its outer end and adjacent board 12 is insulatingly secured to projections 68, 70 of plate 52, as by epoxy adhesive 80, 82. Intermediate curved portion 78 of rod 56 is likewise insulatingly secured to projection 72, as by epoxy adhesive 84.

In the illustrated embodiment, a pair of elongated, strip, light-emitting diodes 86, 88 are mounted on upper surface 74 of plate 52, light-emitting diodes 86, 88 being transversely spaced-apart in the direction 39 of rotation of drum 20, as indicated in FIG. 1, and extending forwardly from board 12, as best seen in FIG. 5. As best seen in FIG. 8, each of the light-emitting diodes 86, 88 has P and N sections joined by a junction 90, top and bottom surfaces 92, 94 and opposite sides 96, 98. In a specific embodiment, gallium arsenide phosphide (GaAsP) light-emitting diodes are employed with light being emitted from top surface 92 in response to excitation of the diode. A relatively thin sheet 100 of insulating material is adhered to bottom surface 94 and, in turn, is adhered to top surface 74 of plate 52.

In the specific embodiment, each of the diodes 86, 88 has four electrical leads 102 welded to and extending from side 96 of its P section, and one electrical lead 104 welded to and extending from side 98 of its N section. Leads 102 of diode 86 are electrically connected to rod 56 and lead 104 is electrically connected to plate 52. Leads 102 of diode 88 are electrically connected to plate 52, and lead 104 is connected to rod 56. Reference to FIG. 9 will reveal that with this particular electrical connection of diodes 86, 88, the diodes are coupled in parallel, oppositely polarized relationship, this connection being particularly suited for energization from an alternating current source, such as a 400 cycle source. A trimming resistor 106 may be coupled in series, as shown in FIG. 9. It will be readily apparent that external electrical connections for energizing light-emitting diodes 86, 88 may be connected to ends 62, 74 of rods 54, 56, and may be printed on the rear surface of board 12, along with the electrical connections to stator windings 36.

It will be readily understood that the particular arrangement, configuration and electrical connection of the light-emitting diodes is illustrative only, and that other semiconductors, such as gallium phosphide (GaP), other diode configurations, a greater or lesser number of diodes, and other electrical connections of the diodes may be employed. Thus, a larger number, such as six, relatively small gallium phosphide diode chips may be employed electrically coupled in parallel and polarized in the same direction rather than being oppositely polarized as in the illustrated embodiment. It will further be understood that one surface of each diode may be directly conductively secured to plate 52, as by welding or soldering. It will also be understood that an electroluminescent panel may be employed rather than light-emitting diodes.

It will be seen that in the illustrated embodiment metal plate 52 serves not only as a supporting platform for the light-emitting diodes, but also serves as a heat sink to dissipate heat from the diodes. However, it will be understood that individual diode chips or bars may be mounted in a molded plastic supporting element or platform also carrying electrical connections such as insert pins, printed or deposited conductors, or the like. It will also be understood that light-emitting devices which emit light from any or all surfaces may be supported on a metal or insulating material platform.

It will be seen that back-lighting of the indicator by the use of light-emitting diodes provides uniform illumination of the indicia on the drum with no shadows or stray light. The light-emitting diodes operate on low voltage, occupy considerably less space and generate less heat than incandescent lamps. The light-emitting diodes are considerably more reliable, have substantially longer life, and are much more rugged than miniature incandescent lamps, there being no filament to burn out or break, the light-emitting diode back-lighted indicator of the invention thus lending itself to miniaturization and being especially suited for applications involving severe environmental conditions, such as vibration and/or wide temperature variations. Further, by employing a plurality of light-emitting diodes, upon failure of one diode, the remaining diode or diodes will still emit sufficient light to illuminate the indicia on the drum. The light-emitting diodes provide more uniform light output over a greater surface area as compared with a miniature incandescent lamp and thus less light diffusion is required.

While there have been described above the principles of this invention in connection with specific apparatus, it is to be clearly understood that this description is made only by way of example and not as a limitation to the scope of the invention.

What is claimed is:

1. A rotatable indicator comprising a cylindrical drum having inner and outer surfaces, said drum having opaque and translucent areas defining indicia on said outer surface, a rigid supporting board of insulating material; means for rotatably mounting said drum on said board; at least one solid state light-emitting device; means for supporting said device on said board within said drum in a position exposed to said inner surface thereof, said supporting means including a metal plate and first and second spaced metal posts secured to said board and extending outwardly therefrom within said drum, said plate being conductively secured to one of said posts and insulatingly secured to the other of said posts; said device being a light-emitting diode having generally planar surfaces with light being emitted from one of said diode surfaces, said one diode surface facing said inner drum surface, the other of said diode surfaces being supported on said plate whereby light emitted by said device back-illuminates said indicia, said diode having P and N sections joined by a junction intermediate and generally parallel with said diode surfaces, means for electrically connecting said device to a source of operating potential, said connecting means including at least one electrical connection connecting one of said sections to said plate and at least one other electrical connection connecting the other of said sections to said other post.

2. The indicator of claim 1 wherein said plate is curved generally to conform to said inner drum surface, said one diode surface being adjacent said inner drum surface.

3. The indicator of claim 2 wherein there are a plurality of said diodes.

4. The indicator of claim 3 wherein each of said diodes comprises an elongated strip, said strips being spaced-apart in the direction of rotation of said drum and extending outwardly from said board.

5. The indicator of claim 4 wherein said other surfaces of said diodes are adhered to a relatively thin sheet of insulating material, said sheet being adhered to said plate.

6. The indicator of claim 5 wherein each of said strips has opposite sides, said connections comprising at least one electrical lead connecting one of said section of each strip on one side thereof to said plate and at least one electrical lead connecting the other of said sections of each strip on the other side thereof to said other post.

7. The indicator of claim 6 wherein there are two said strips, said leads connecting the P section of one strip and the N section of the other strip to said plate, and the N section of said one strip and the P section of said other strip to said other post, whereby said devices are coupled in parallel and in oppositely polarized relationship across said source.

* * * * *